United States Patent
Tanaka et al.

(10) Patent No.: US 11,975,406 B2
(45) Date of Patent: May 7, 2024

(54) LASER MACHINING APPARATUS, METHOD FOR SETTING MACHINING CONDITIONS, AND CONTROL DEVICE FOR LASER MACHINING APPARATUS

(71) Applicant: AMADA CO., LTD., Kanagawa (JP)

(72) Inventors: Yoichi Tanaka, Kanagawa (JP); Chiaki Kawahara, Kanagawa (JP); Koji Funaki, Kanagawa (JP); Hideyuki Watanabe, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 600 days.

(21) Appl. No.: 17/285,215

(22) PCT Filed: Oct. 8, 2019

(86) PCT No.: PCT/JP2019/039598
§ 371 (c)(1),
(2) Date: Apr. 14, 2021

(87) PCT Pub. No.: WO2020/085074
PCT Pub. Date: Apr. 30, 2020

(65) Prior Publication Data
US 2022/0001489 A1 Jan. 6, 2022

(30) Foreign Application Priority Data
Oct. 22, 2018 (JP) .................................. 2018-198278

(51) Int. Cl.
*B23K 26/082* (2014.01)
*B23K 26/04* (2014.01)
*B23K 26/38* (2014.01)

(52) U.S. Cl.
CPC .......... *B23K 26/082* (2015.10); *B23K 26/048* (2013.01); *B23K 26/38* (2013.01)

(58) Field of Classification Search
CPC .. B23K 26/0884; B23K 26/048; B23K 26/38; B23K 26/082; B23K 37/0408
See application file for complete search history.

(56) References Cited

U.S. PATENT DOCUMENTS

2015/0014889 A1* 1/2015 Goya ................. B23K 26/0652
219/121.72
2015/0352666 A1 12/2015 Fujita

FOREIGN PATENT DOCUMENTS

DE 102008053397 A1 12/2009
JP H07-236987 A 9/1995
(Continued)

OTHER PUBLICATIONS

Extended European Search Report for corresponding EP Application No. 19875409.5 dated Nov. 29, 2021.
(Continued)

*Primary Examiner* — Thien S Tran
(74) *Attorney, Agent, or Firm* — Renner, Otto, Boisselle & Sklar, LLP

(57) ABSTRACT

A moving mechanism relatively moves a machining head emitting a laser beam, with respect to a sheet metal along a surface of the sheet metal. A beam vibrating mechanism vibrates the laser beam for irradiation on the sheet metal, while the machining head is relatively moved by the moving mechanism. A machining condition setting section sets pattern selection information to select a vibration pattern of the laser beam by the beam vibrating mechanism, and a parameter to determine a vibrating way in the vibration pattern, in accordance with machining conditions specified for each machining command to machine the sheet metal in a machining program generated to machine the sheet metal, and including a machining velocity of the sheet metal associated with relative movement of the machining head by the moving mechanism.

4 Claims, 11 Drawing Sheets

(56) References Cited

FOREIGN PATENT DOCUMENTS

| | | | |
|---|---|---|---|
| JP | 10-175084 A | | 6/1998 |
| JP | 10328870 A | * | 12/1998 |
| JP | 2005-279730 A | | 10/2005 |
| JP | 2010-162561 A | | 7/2010 |
| JP | 2011-25272 A | | 2/2011 |
| JP | 2015-174096 A | | 10/2015 |
| WO | 2014/132503 A1 | | 9/2014 |
| WO | 2015/156119 A1 | | 10/2015 |
| WO | WO-2015156119 A1 * | 10/2015 | ............ B23K 26/00 |
| WO | 2019/176431 A1 | | 9/2019 |

OTHER PUBLICATIONS

International Search Report for corresponding Application No. PCT/JP2019/039598, mailed Dec. 10, 2019.
Written Opinion for corresponding Application No. PCT/JP2019/039598, mailed Dec. 10, 2019.
T. Heston, Shaping the laser beam for the best cut, The FABRICATOR 67, Jan. 4, 2017 (cited in specification).

* cited by examiner

FIG. 8

[MACHINING CONDITION FILE NAME] C-SUS3.0 [LASER OSCILLATOR NAME]...
[MATERIAL]...[THICKNESS]...[NOZZLE TYPE]...[NOZZLE DIAMETER]...[FOCUSING LENS FOCAL LENGTH]...

| CONDITION No. | VELOCITY | OUTPUT | FREQUENCY | DUTY | GAS PRESSURE | GAS TYPE | NOZZLE GAP | TOOL RADIUS COMPENSATION AMOUNT | FOCUS COMPENSATION AMOUNT |
|---|---|---|---|---|---|---|---|---|---|
| 1 | 400 | 2000 | 200 | 35 | 1.6 | 4 | 0.7 | 0.08 | 0.00 |
| 2 | 1500 | 2000 | 1000 | 60 | 1.6 | 4 | 0.5 | 0.08 | 0.00 |
| 3 | 4500 | 2000 | 4000 | 100 | 1.6 | 4 | 0.3 | 0.08 | 0.00 |
| 4 | 5000 | 2000 | 4000 | 100 | 1.6 | 4 | 0.3 | 0.08 | 0.00 |
| 5 | 3000 | 2000 | 3500 | 100 | 1.6 | 4 | 0.3 | 0.08 | 0.00 |
| ... | ... | ... | ... | ... | ... | ... | ... | ... | ... |

FIG. 9

| VIBRATION PATTERN NUMBER | VIBRATION PATTERN NAME | FREQUENCY RATIO | | PHASE DIFFERENCE |
| --- | --- | --- | --- | --- |
| | | x-DIRECTION | y-DIRECTION | |
| 0 | NO VIBRATION | 0 | 0 | 0 |
| 1 | PARALLEL VIBRATION PATTERN | 1 | 0 | 0 |
| 2 | ORTHOGONAL VIBRATION PATTERN | 0 | 1 | 0 |
| 3 | CIRCULAR VIBRATION PATTERN | 1 | 1 | 0 |
| 4 | C-SHAPED VIBRATION PATTERN | 2 | 1 | 90 |
| 5 | 8-SHAPED VIBRATION PATTERN | 2 | 1 | 0 |
| ⋮ | ⋮ | ⋮ | ⋮ | ⋮ |

FIG. 10

| E-NUMBER | VELOCITY | OUTPUT | ... | VIBRATION PATTERN NUMBER | Qx | Qy | FREQUENCY |
|---|---|---|---|---|---|---|---|
| E1 | 400 | 2000 | ... | 0 | 0 | 0 | 0 |
| E2 | 1500 | 2000 | ... | 3 | 90 | 90 | 3000 |
| E3 | 4500 | 2000 | ... | 4 | 80 | 200 | 1500 |
| E4 | 5000 | 2000 | ... | 1 | 150 | 0 | 2000 |
| E5 | 3000 | 2000 | ... | 2 | 0 | 300 | 2500 |
| ... | ... | ... | ... | ... | ... | ... | ... |

LASER MACHINING APPARATUS, METHOD FOR SETTING MACHINING CONDITIONS, AND CONTROL DEVICE FOR LASER MACHINING APPARATUS

TECHNICAL FIELD

The present disclosure relates to a laser machining apparatus, a method for setting machining conditions, and a control device for the laser machining apparatus.

BACKGROUND ART

Laser machining apparatuses that cut sheet metals by laser beams emitted from laser oscillators, and produce products having predetermined shapes are widely used. In Non-Patent Literature 1, it is described that a sheet metal is cut while vibrating a laser beam in a predetermined vibration pattern.

CITATION LIST

Patent Literature

Non-Patent Literature 1: January 2017, the FABRICATOR 67, Shaping the Beam for the Best Cut

SUMMARY

When a sheet metal is cut by a laser machining apparatus, it is necessary to appropriately select a vibration pattern of a laser beam in accordance with machining conditions of the sheet metal. An object of one or more embodiments is to provide a laser machining apparatus, a method for setting machining conditions, and a control device for the laser machining apparatus that allow for appropriate selection of a vibration pattern of a laser beam in accordance with machining conditions of a sheet metal, when the laser machining apparatus cuts the sheet metal.

According to a first aspect of one or more embodiments, a laser machining apparatus is provided, the laser machining apparatus including a moving mechanism configured to relatively move a machining head emitting a laser beam, with respect to a sheet metal along a surface of the sheet metal, a beam vibrating mechanism configured to vibrate the laser beam for irradiation on the sheet metal, while the machining head is relatively moved by the moving mechanism, and a machining condition setting section configured to set pattern selection information to select a vibration pattern of the laser beam by the beam vibrating mechanism, and a parameter to determine a way of vibration in the vibration pattern, in accordance with machining conditions specified for each machining command to machine the sheet metal in a machining program generated to machine the sheet metal, and including a machining velocity of the sheet metal associated with relative movement of the machining head by the moving mechanism.

According to a second aspect of one or more embodiments, a method for setting machining conditions is provided, the method for setting the machining conditions including reading a machining condition file from a storage section, machining conditions when machining a sheet metal being set in the machining condition file in correspondence to each machining condition number of a plurality of machining condition numbers, displaying, on a display, at least the plurality of machining condition numbers in the read machining condition file, and setting pattern selection information to select a vibration pattern of a laser beam for irradiation on the sheet metal, and a parameter to determine a way of vibration in the vibration pattern, in correspondence to each machining condition number of the plurality of machining condition numbers displayed on the display.

According to a third aspect of one or more embodiments, a control device for a laser machining apparatus is provided, the control device being configured to control the laser machining apparatus including a moving mechanism configured to relatively move a machining head emitting a laser beam, with respect to a sheet metal along a surface of the sheet metal, and a beam vibrating mechanism configured to vibrate the laser beam for irradiation on the sheet metal, while the machining head is relatively moved by the moving mechanism, the control device being configured to read, from a machining program database, a machining program generated to machine the sheet metal and including a command to select a machining condition file, and read, out of a plurality of machining condition files stored in a machining condition database, a machining condition file selected based on the command to select the machining condition file, the command being included in the read machining program, the machining condition file including a machining condition number specified for each machining command to machine the sheet metal in the machining program, velocity data set in correspondence to each machining condition number, and indicating a machining velocity of the sheet metal associated with relative movement of the machining head by the moving mechanism, pattern selection information set in correspondence to each machining condition number, to select a vibration pattern of the laser beam by the beam vibrating mechanism, and a parameter set in correspondence to each machining condition number, to determine a way of vibration in the vibration pattern, the control device being configured to control the moving mechanism to relatively move the machining head at the machining velocity based on the velocity data, for each machining condition number, and control the beam vibrating mechanism to vibrate the laser beam by the way of vibration based on the parameter, in the vibration pattern based on the pattern selection information, for each machining condition number.

According to a laser machining apparatus, a method for setting machining conditions, and a control device for the laser machining apparatus of one or more embodiments, an appropriate vibration pattern can be set in accordance with machining conditions of a sheet metal.

BRIEF DESCRIPTION OF DRAWINGS

FIG. 8 is a diagram illustrating an example of a machining condition file.

FIG. 9 is a table illustrating a first parameter to determine each vibration pattern.

FIG. 10 is a table illustrating a setting list to set a vibration pattern number and a second parameter to determine each vibration pattern in correspondence to each machining condition number.

DESCRIPTION OF EMBODIMENT

Figure 1:
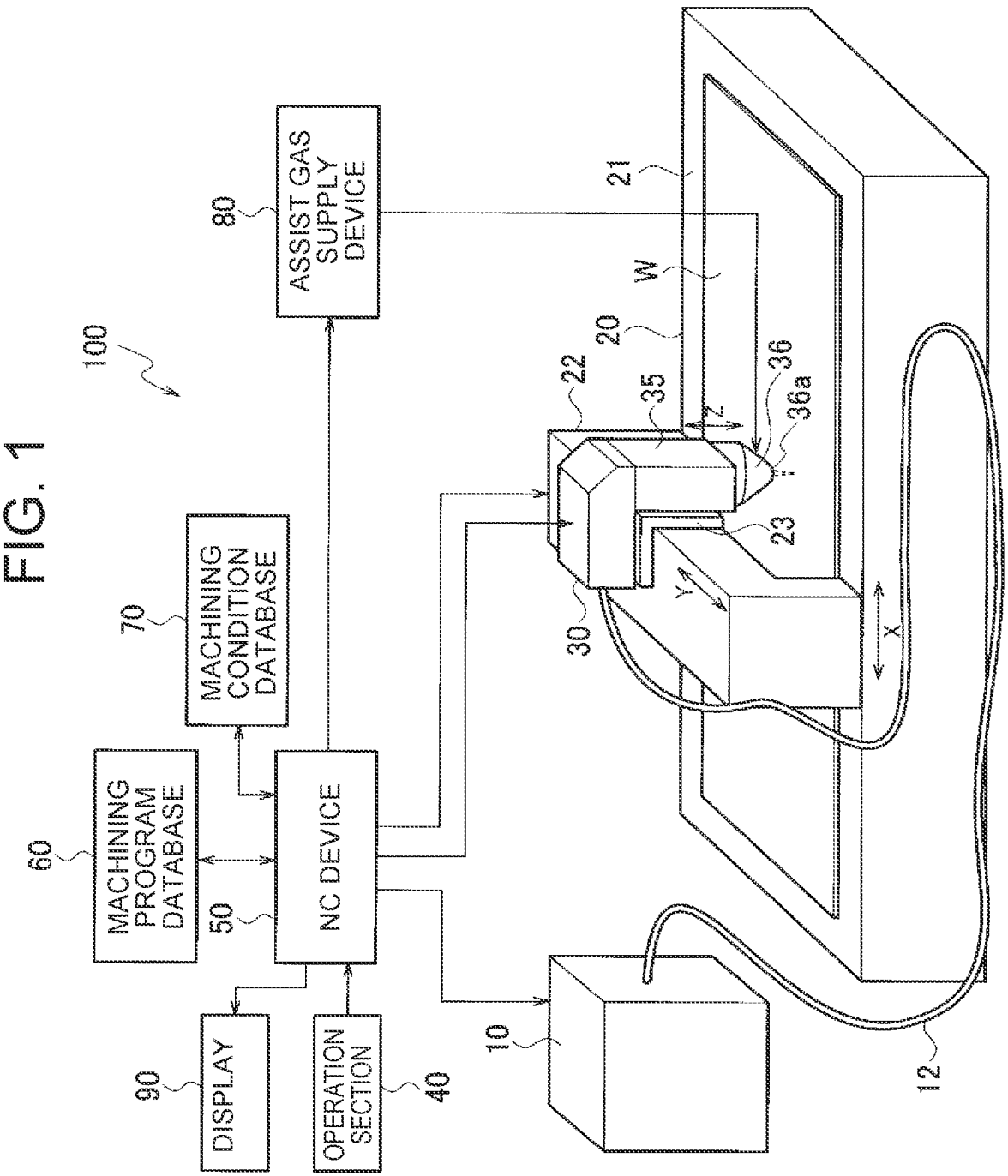
FIG. 1 is a diagram illustrating an entire configuration example of a laser machining apparatus of one or more embodiments.

Hereinafter, a laser machining apparatus, a method for setting machining conditions and a control device for a laser machining apparatus of one or more embodiments will be described with reference to the accompanying drawings. In FIG. 1, a laser machining apparatus 100 includes a laser oscillator 10 that generates and emits a laser beam, a laser machining unit 20, and a process fiber 12 that transmits the laser beam emitted by the laser oscillator 10 to the laser machining unit 20.

Further, the laser machining apparatus 100 includes an operation section 40, an NC device 50, a machining program database 60, a machining condition database 70, an assist gas supply device 80, and a display 90. The NC device 50 is an example of a control device that controls respective parts of the laser machining apparatus 100.

As the laser oscillator 10, a laser oscillator that amplifies an excitation beam emitted from a laser diode to emit a laser beam of a predetermined wavelength, or a laser oscillator that directly uses a laser beam emitted from a laser diode is preferable. The laser oscillator 10 is, for example, a solid laser oscillator, a fiber laser oscillator, a disk laser oscillator, or a direct diode laser oscillator (DDL oscillator).

The laser oscillator 10 emits a laser beam in a band of 1 μm with a wavelength of 900 nm to 1100 nm. Taking a fiber laser oscillator and a DDL oscillator as examples, the fiber laser oscillator emits a laser beam with a wavelength of 1060 nm to 1080 nm, and the DDL oscillator emits a laser beam with a wavelength of 910 mm to 950 nm.

The laser machining unit 20 has a machining table 21 where a sheet metal W to be machined is placed, a gate-type X-axis carriage 22, a Y-axis carriage 23, a collimator unit 30 fixed to the Y-axis carriage 23, and a machining head 35. The X-axis carriage 22 is configured to be movable in an X-axis direction on the machining table 21. The Y-axis carriage 23 is configured to be movable in a Y-axis direction perpendicular to the X-axis on the X-axis carriage 22. The X-axis carriage 22 and the Y-axis carriage 23 function as a moving mechanism that moves the machining head 35 in the X-axis direction, the Y-axis direction, or an arbitrary composition direction of an X-axis and a Y-axis, along a surface of the sheet metal W.

Instead of moving the machining head 35 along the surface of the sheet metal W, a position of the machining head 35 may be fixed, and the sheet metal W may be configured to move. The laser machining apparatus 100 can include the moving mechanism that moves the machining head 35 relatively to the surface of the sheet metal W.

To the machining head 35, a nozzle 36 that has a circular opening 36a at a tip end portion, and emits a laser beam from the opening 36a is attached. The sheet metal W is irradiated with the laser beam emitted from the opening 36a of the nozzle 36. The assist gas supply device 80 supplies nitrogen, oxygen, mixed gas of nitrogen and oxygen, or air as assist gas to the machining head 35. At a time of machining the sheet metal W, the assist gas is blown to the sheet metal W from the opening 36a. The assist gas discharges molten metal in a kerf width where the sheet metal W is melted.

Figure 2:
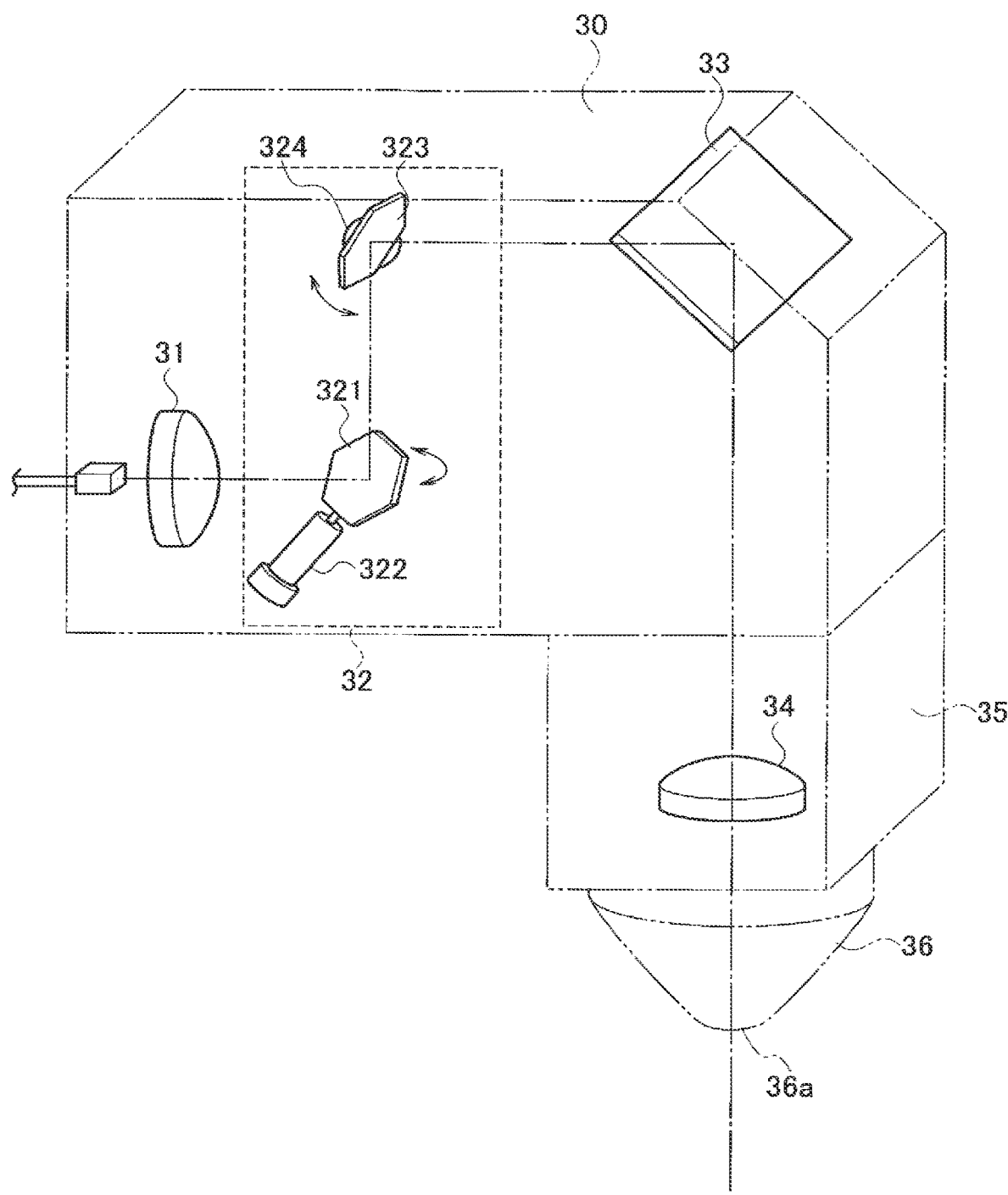
FIG. 2 is a perspective view illustrating a detailed configuration example of a collimator unit and a machining head in the laser machining apparatus of one or more embodiments.

As illustrated in FIG. 2, the collimator unit 30 includes a collimation lens 31 that converts a divergent laser beam emitted from the process fiber 12 into a parallel laser beam (collimated laser beam). Further, the collimator unit 30 includes a galvano scanner unit 32, and a bend mirror 33 that reflects a laser beam emitted from the galvano scanner unit 32 toward a lower part in a Z-axis direction perpendicular to the X-axis and the Y-axis. The machining head 35 includes a focusing lens 34 that focuses the laser beam reflected by the bend mirror 33, and irradiates the sheet metal W.

To adjust a focus position of the laser beam, the focusing lens 34 is configured to be movable in a direction close to the sheet metal W and a direction away from the sheet metal W, by an unshown drive section and the moving mechanism.

The laser machining apparatus 100 is centered so that the laser beam emitted from the opening 36a of the nozzle 36 is located at a center of the opening 36a. In a regular state, the laser beam is emitted from the center of the opening 36a. The galvano scanner unit 32 functions as a beam vibrating mechanism that vibrates the laser beam that advances in the machining head 35 and is emitted from the opening 36a, in the opening 36a. How the galvano scanner unit 32 vibrates the laser beam will be described later.

The galvano scanner unit 32 has a scanning mirror 321 that reflects the laser beam emitted from the collimation lens 31, and a drive section 322 that rotates the scanning mirror 321 to a predetermined angle. Further, the galvano scanner unit 32 has a scanning mirror 323 that reflects the laser beam emitted from the scanning mirror 321, and a drive section 324 that rotates the scanning mirror 323 to a predetermined angle.

The drive sections 322 and 324 can reciprocally vibrate the scanning mirrors 321 and 323 within a predetermined angle range respectively based on control by the NC device 50. By reciprocally vibrating either one or both of the scanning mirror 321 and the scanning mirror 323, the galvano scanner unit 32 vibrates the laser beam with which the sheet metal W is irradiated.

The galvano scanner unit 32 is one example of the beam vibrating mechanism, and the beam vibrating mechanism is not limited to the galvano scanner unit 32 having a pair of scanning mirrors.

Figure 3:
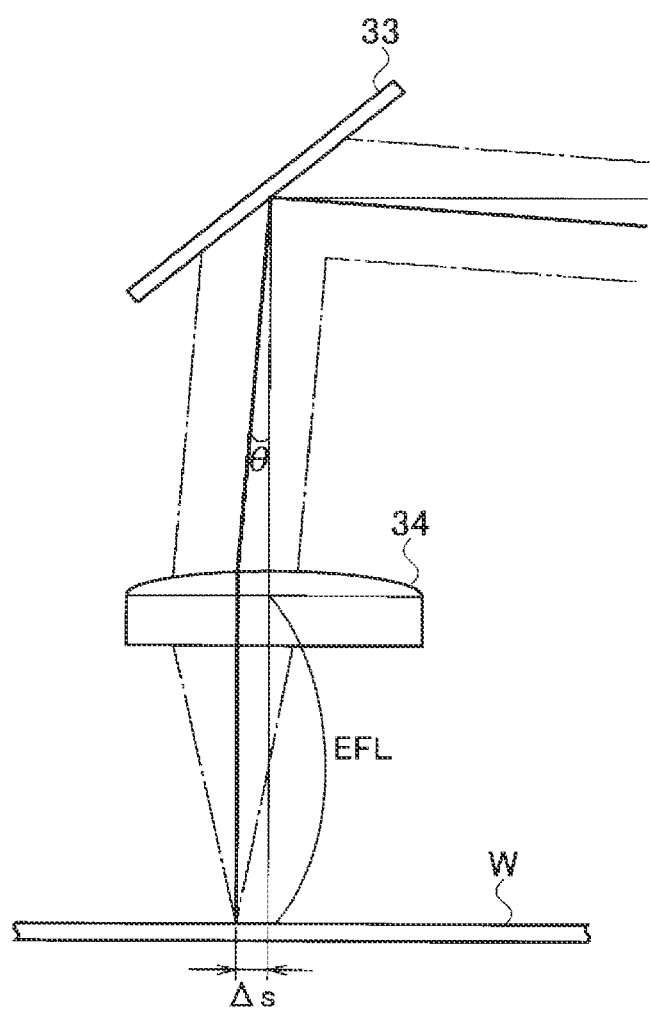
FIG. 3 is a diagram for explaining a displacement of an irradiation position of a sheet metal with a laser beam by a beam vibrating mechanism.

FIG. 3 illustrates a state where either one or both of the scanning mirror 321 and the scanning mirror 323 is or are tilted, and a position of the laser beam with which the sheet metal W is irradiated is displaced. In FIG. 3, a fine solid line that is bent by the bend mirror 33 and passes through the focusing lens 34 shows an optical axis of the laser beam in the regular state of the laser machining apparatus 100.

Note that, in detail, an angle of the optical axis of the laser beam that is incident on the bend mirror 33 changes by an operation of the galvano scanner unit 32 located in front of the bend mirror 33, and the optical axis deviates from a center of the bend mirror 33. In FIG. 3, for simplification, incident positions of the laser beams onto the bend mirror 33 are assumed to be same positions before and after the operation of the galvano scanner unit 32.

The optical axis of the laser beam is assumed to be displaced from the position shown by the fine solid line to a position shown by a thick solid line by the action by the galvano scanner unit 32. When the laser beam reflected by the bend mirror 33 is assumed to incline at an angle θ, an irradiation position of the laser beam on the sheet metal W is displaced by a distance Δs. When a focal length of the focusing lens 34 is EFL (Effective Focal Length), the distance Δs is calculated by EFL×sineθ.

If the galvano scanner unit 32 inclines the laser beam at the angle θ in an opposite direction to a direction illustrated in FIG. 3, the irradiation position of the laser beam on the sheet metal W can be displaced by the distance Δs in an opposite direction to the direction illustrated in FIG. 3. The distance Δs is a distance less than a radius of the opening 36a, and is preferably a distance less than or equal to a maximum distance when the maximum distance is a distance obtained by subtracting a predetermined margin from the radius of the opening 36a.

The NC device 50 can vibrate the laser beam in a predetermined direction within a surface of the sheet metal W by controlling the drive sections 322 and 324 of the galvano scanner unit 32. By vibrating the laser beam, it is possible to vibrate a beam spot formed on the surface of the sheet metal W.

The laser machining apparatus 100 configured as above cuts the sheet metal W with the laser beam emitted from the laser oscillator 10 and produces a product having a predetermined shape. The laser machining apparatus 100 locates a focus of the laser beam at any appropriate position on a top surface of the sheet metal W, or within a thickness of the sheet metal W above the top surface by a predetermined distance or below the top surface by a predetermined distance, and cuts the sheet metal while vibrating the laser beam in a predetermined vibration pattern.

A machining program to cut the sheet metal W is stored in the machining program database 60. The NC device 50 reads the machining program from the machining program database 60, and selects any machining condition file from a plurality of machining condition files stored in the machining condition database 70. The NC device 50 controls the laser machining apparatus 100 to cut the sheet metal W based on the read machining program and machining conditions set in the selected machining condition file.

As described later, the laser machining apparatus 100 is configured to be able to set the vibration pattern of the laser beam in correspondence to each machining condition set in the machining condition file. The display 90 displays a set item when setting the vibration pattern of the laser beam in accordance with each machining condition, based on the control by the NC device 50.

Examples of the vibration pattern in which the NC device 50 vibrates the laser beam by the galvano scanner unit 32 will be described with reference to FIG. 4A to FIG. 4E. It is assumed that a cutting advancing direction of the sheet metal W is an x-direction and that a direction orthogonal to the x-direction within the surface of the sheet metal W is a y-direction. The vibration pattern is set to each machining condition of the machining condition file stored in the machining condition database 70, and the NC device 50 controls the galvano scanner unit 32 to vibrate the laser beam in the vibration pattern set to the machining conditions.

Figure 4A:
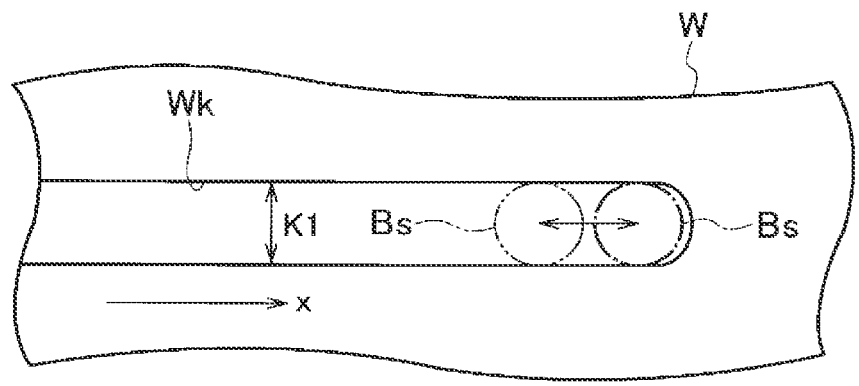
FIG. 4A is a diagram illustrating a parallel vibration pattern of the laser beam.

FIG. 4A to FIG. 4E illustrate the vibration patterns in a state where the machining head 35 is not moved in the x-direction to make it easier to understand the vibration pattern. FIG. 4A illustrates a vibration pattern in which a beam spot Bs is vibrated in the x-direction in a groove Wk formed by advancement of the beam spot Bs. The vibration pattern illustrated in FIG. 4A is referred to as a parallel vibration pattern. At this time, a kerf width K1 of the groove Wk is substantially a diameter of the beam spot Bs. When a frequency at which the beam spot Bs is vibrated in a direction parallel to the cutting advancing direction is Fx and a frequency at which the beam spot Bs is vibrated in a direction orthogonal to the cutting advancing direction is Fy, the parallel vibration pattern is a vibration pattern in which Fx:Fy is 1:0.

Figure 4B:
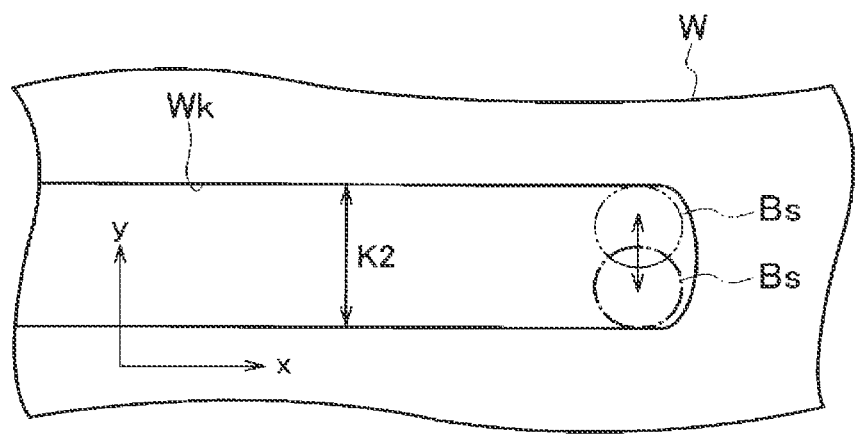
FIG. 4B is a diagram illustrating an orthogonal vibration pattern of the laser beam.

FIG. 4B illustrates a vibration pattern in which the beam spot Bs is vibrated in the y-direction. When the beam spot Bs is vibrated in the y-direction, the groove Wk has a kerf width K2 larger than the kerf width K1. A vibration pattern illustrated in FIG. 4B is referred to as an orthogonal vibration pattern. The orthogonal vibration pattern is a vibration pattern in which Fx:Fy is 0:1.

Figure 4C:
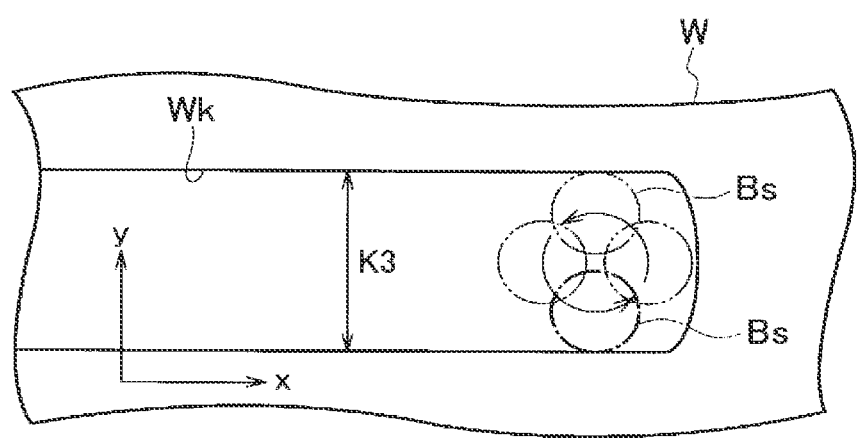
FIG. 4C is a diagram illustrating a circular vibration pattern of the laser beam.

FIG. 4C illustrates a vibration pattern in which the beam spot Bs is vibrated so that the beam spot Bs draws a circle. When the beam spot Bs is vibrated in a circular shape, the groove Wk has a kerf width K3 larger than the kerf width K1. The vibration pattern illustrated in FIG. 4C is referred to as a circular vibration pattern. The circular vibration pattern is a vibration pattern in which Fx:Fy is 1:1.

Figure 4D:
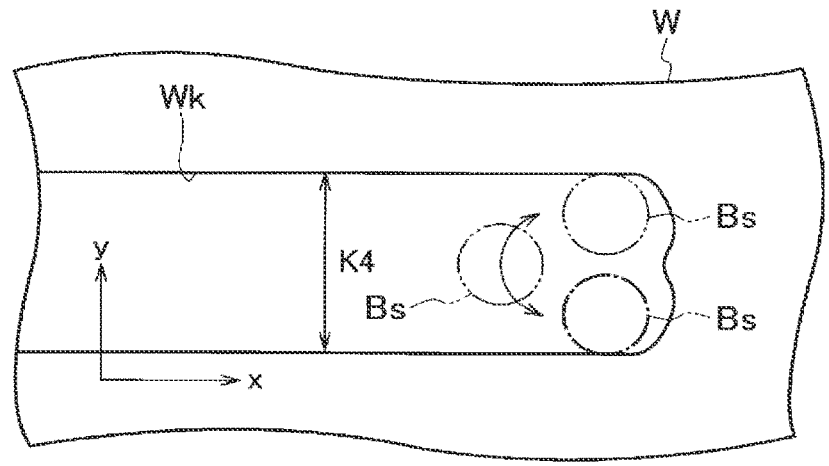
FIG. 4D is a diagram illustrating a C-shaped vibration pattern of the laser beam.

FIG. 4D illustrates a vibration pattern in which the beam spot Bs is vibrated so that the beam spot Bs draws alphabet C. When the beam spot Bs is vibrated in a C-shape, the groove Wk has a kerf width K4 larger than the kerf width K1. The vibration pattern illustrated in FIG. 4D is referred to as a C-shaped vibration pattern. The C-shaped vibration pattern is a vibration pattern in which Fx:Fy is 2:1 (=1:1/2). Further, a phase difference between Fy and Fx is $1/2\pi$(=90').

Figure 4E:
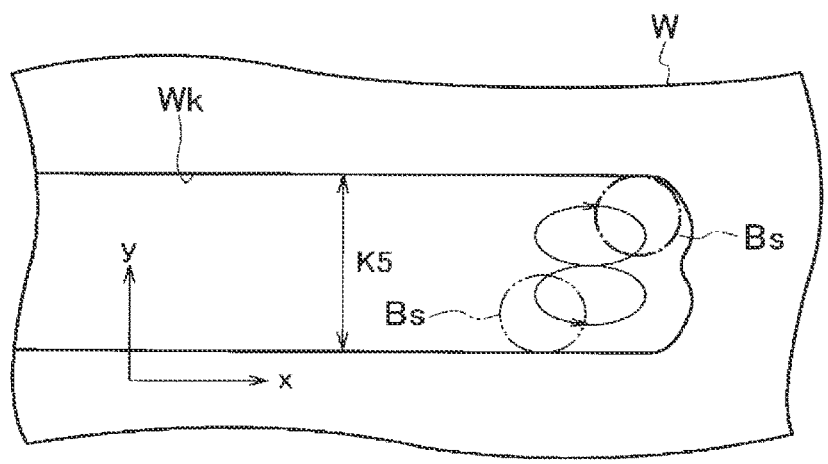
FIG. 4E is a diagram illustrating an 8-shaped vibration pattern of the laser beam.

FIG. 4E illustrates a vibration pattern in which the beam spot Bs is vibrated so that the beam spot Bs draws a figure of 8. When the beam spot Bs is vibrated in an 8-shape, the groove Wk has a kerf width K5 larger than the kerf width K1. The vibration pattern illustrated in FIG. 4E is referred to as an 8-shaped vibration pattern. The 8-shaped vibration pattern is a vibration pattern in which Fx:Fy is 2:1.

Figure 5:
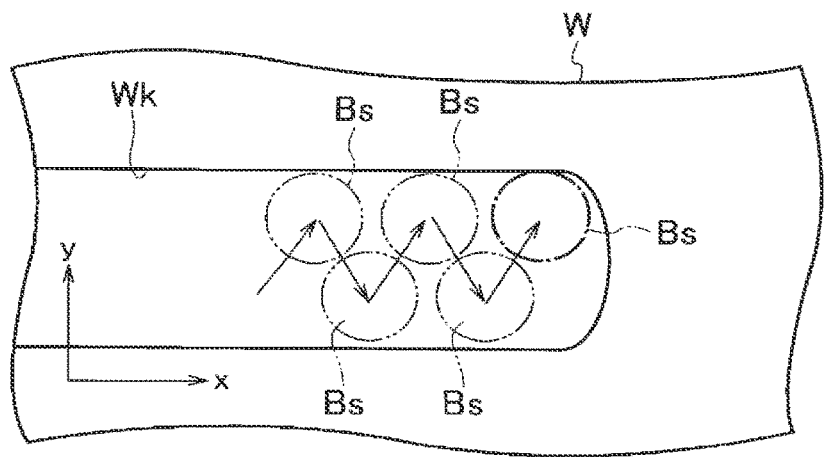
FIG. 5 is a diagram illustrating an actual vibration pattern when the orthogonal vibration pattern illustrated in FIG. 4B is used.

In reality, while the machining head 35 moves in the cutting advancing direction, the laser beam vibrates. Therefore, the vibration pattern is a vibration pattern obtained by adding a displacement in the cutting advancing direction (the x-direction) to the vibration patterns illustrated in FIG. 4A to FIG. 4E. Taking the orthogonal vibration pattern illustrated in FIG. 4B as an example, the beam spot Bs vibrates in the y-direction while moving in the x-direction, and hence, an actual orthogonal vibration pattern is such a vibration pattern as illustrated in FIG. 5.

Figure 6:
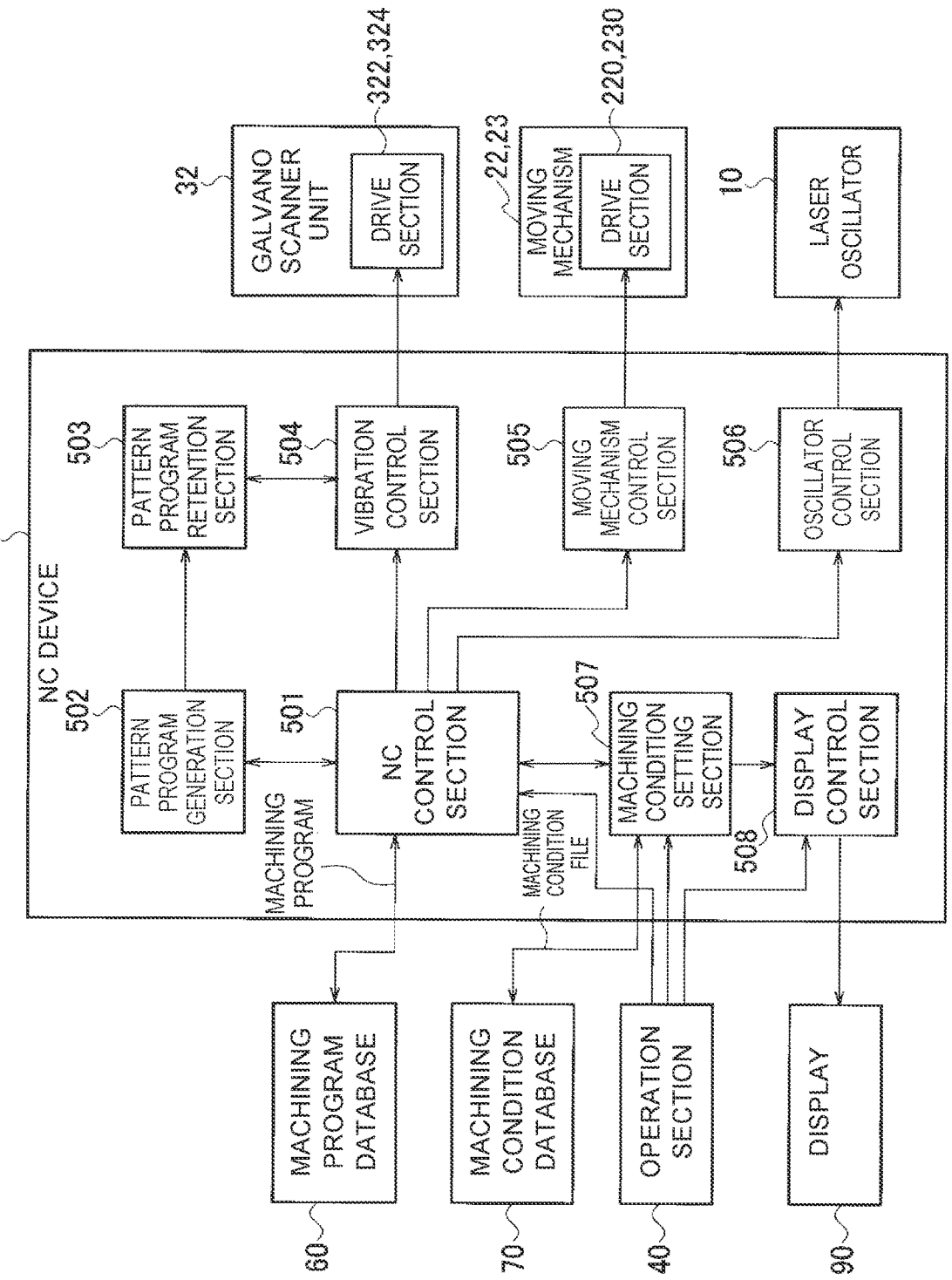
FIG. 6 is a block diagram illustrating a functional configuration example of an NC device provided in the laser machining apparatus of one or more embodiments.

Next, description will be made as to how an appropriate vibration pattern is set in accordance with the machining conditions of the sheet metal W with reference to FIG. 6 to FIG. 10. As illustrated in FIG. 6, the NC device 50 includes, as a functional configuration, an NC control section 501, a pattern program generation section 502, a pattern program retention section 503, a vibration control section 504, a moving mechanism control section 505, an oscillator control section 506, a machining condition setting section 507, and a display control section 508.

When the operation section 40 gives an instruction to read the machining program, the NC control section 501 reads the machining program beforehand generated to cut the sheet metal W and stored in the machining program database 60. As an example, the machining program is constituted of a plurality of commands represented in machine control codes as illustrated in FIG. 7.

Figure 7:
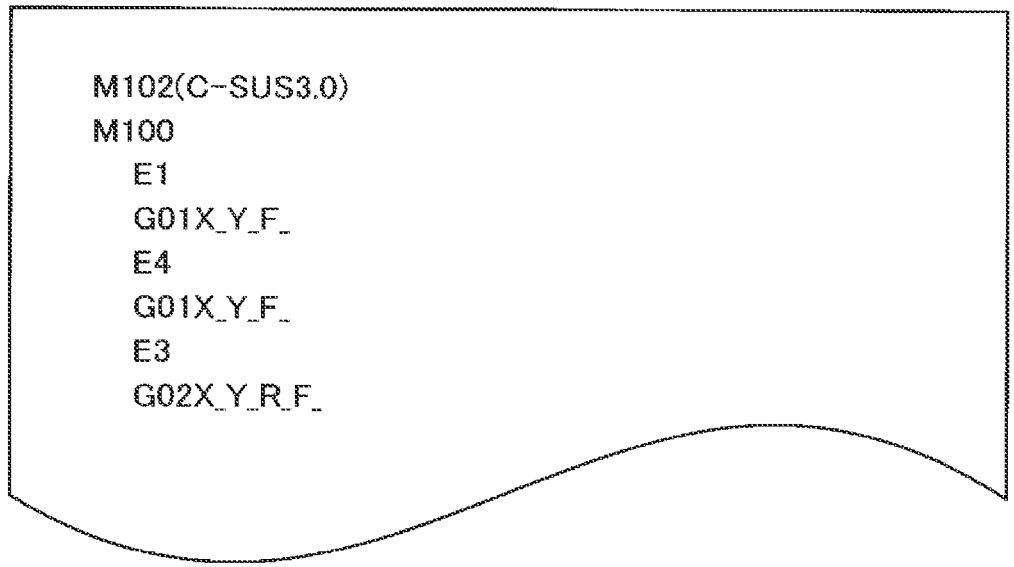
FIG. 7 is a diagram illustrating an example of a machining program.

In FIG. 7, M102 indicates a command to select the machining condition file, and here, as an example, it is commanded to select the machining condition file named C-SUS3.0. M100 indicates a command to execute laser machining. A number with alphabet E (E-number) indicates an after-mentioned machining condition number. A command starting with G01 indicates a machining command of linear interpolation to move the laser beam at a moving velocity F on a line connecting a start point and an end point specified with X and Y.

A command starting with G02 indicates a machining command of circular interpolation to move the laser beam at the moving velocity F on a circular arc connecting a start point and an end point. There are a method of identifying a circular arc by specifying a radius of the circular arc and a method of identifying a circular arc by specifying a center of the circular arc, and the former method is shown here.

In the machining condition database 70, the machining condition file named C-SUS3.0 illustrated in FIG. 8 and a plurality of other machining condition files are stored. The machining condition file illustrated in FIG. 8 indicates a state where an after-mentioned parameter to determine the vibration pattern is not added. The parameter is an element to determine a specific way of vibration in the vibration pattern. First, outline of the machining condition file in the state where the parameter to determine the vibration pattern is not added is as follows.

As illustrated in FIG. 8, the machining condition file includes information on a name of the laser oscillator 10, the material and thickness of the sheet metal W, a nozzle type, i.e., a type of the nozzle 36, a nozzle diameter, i.e., a diameter of the opening 36*a*, and the focal length of the focusing lens 34. These pieces of information indicate conditions to be applied in common even if the machining condition with any machining condition number set in the machining condition file is selected. The machining condition file may include the other pieces of information the illustration of which are omitted from FIG. 8.

In the machining condition file, various conditions when machining the sheet metal W are set in correspondence to a plurality of machining condition numbers. Each machining condition number corresponds to the number with alphabet E (the E-number) of the machining program illustrated in FIG. 7. In FIG. 8, a velocity indicates a machining velocity of the sheet metal W that is the moving velocity of the machining head 35 (velocity data). Output, frequency and duty indicate a laser output (laser power), a pulse oscillating frequency, and duty of the laser oscillator 10, respectively. A gas pressure and gas type indicate the gas pressure and gas type of assist gas to be supplied by the assist gas supply device 80, respectively.

A nozzle gap indicates a distance from a tip end of the nozzle 36 to the top surface of the sheet metal W. A tool radius compensation amount indicates a distance by which the laser beam is displaced from an end portion at a time of scanning the laser beam along the end portion of the product. The tool radius compensation amount is the distance corresponding to a radius of the beam spot Bs. A focus compensation amount indicates a distance by which the focus of the laser beam is displaced upward or downward from a reference position (0.00). Other conditions that are omitted from FIG. 8 may be set in correspondence to each machining condition number.

As illustrated in FIG. 9, in the machining condition database 70, a first parameter to determine each vibration pattern is stored in correspondence to the vibration pattern number to select each vibration pattern. The vibration pattern number is pattern selection information to select the vibration pattern of the laser beam. The first parameter is a parameter to determine a shape of each vibration pattern. Here, a vibration pattern name is indicated in correspondence to each vibration pattern number to facilitate understanding, but it is not necessary to store the vibration pattern name in the machining condition database 70.

In the machining condition database 70, a frequency ratio of a frequency at which the laser beam is vibrated in the x-direction to a frequency at which the laser beam is vibrated in the y-direction and a phase difference between the vibration in the x-direction and the vibration in the y-direction are set as the first parameters in correspondence to each vibration pattern number.

When the operation section 40 performs an operation of setting the parameter to determine the vibration pattern, the machining condition setting section 507 controls the display control section 508 to display, on the display 90, such a setting list as illustrated in FIG. 10. As illustrated in FIG. 10, the setting list is a list to set a second parameter for each vibration pattern number, the second parameter being set to select the vibration pattern number in correspondence to each E-number, and determine the vibration pattern of each vibration pattern number. The second parameter is the parameter to determine an amplitude and frequency of each vibration pattern, the pattern having the shape determined in accordance with the first parameter.

In FIG. 10, Qx indicates a set value to set the amplitude in the x-direction, and Qy indicates a set value to set the amplitude in the y-direction. For example, in the machining conditions of E-number E2, a circular vibration pattern with an amplitude of 90 (μm) in the x-direction, an amplitude of 90 (μm) in the y-direction and a frequency of 3000 (Hz) is set.

It is not necessary to display, in the setting list, all kinds of information corresponding to the machining condition numbers of the machining condition file illustrated in FIG. 8. In the setting list, the E-numbers may only be displayed, and the E-numbers may be associated with the vibration pattern numbers and the second parameters.

By operating the operation section 40, a manufacturer setting person or serviceman of the laser machining apparatus 100 can display the setting list illustrated in FIG. 10 on the display 90, to set the vibration pattern number and the second parameter. It is preferable that a user of the laser machining apparatus 100 cannot perform an operation of displaying, on the display 90, set items surrounded with a thick solid line, and cannot see the set items surrounded with the thick solid line. When the user operates the operation section 40 to display a list of E-numbers on the display 90, a list of machining conditions excluding the set items surrounded with the thick solid line may be set to be displayed.

The machining condition file to which the vibration pattern number and the second parameter to determine the vibration pattern as above are added is written into the machining condition database 70. The machining condition database 70 is an example of a storage section that stores the machining condition file to which the vibration pattern number and the second parameter are added. The machining condition file may be stored in another storage section connected to the NC device 50.

When the machining program illustrated in FIG. 7 is supplied to the NC control section 501, information in which the first parameter is associated with each vibration pattern number illustrated in FIG. 9 and the machining condition file named C-SUS3.0 are read from the machining condition database 70. The vibration pattern number and the second parameter are added to the machining condition file. The information and the machining condition file illustrated in FIG. 9 are supplied from the machining condition setting section 507 to the NC control section 501.

The pattern program generation section 502 generates a pattern program to vibrate the laser beam in the vibration patterns corresponding to all the E-numbers included in the machining program read by the NC control section 501. The pattern program is a control code to operate the galvano scanner unit 32, and in the program, order (processing) to a computer is described. The pattern program generation section 502 can generate the pattern program based on the first and second parameters supplied to the NC control section 501. The pattern program generated by the pattern program generation section 502 is supplied to and retained in the pattern program retention section 503.

After being commanded to execute the laser machining by the machining program, the NC control section 501 supplies the vibration pattern number for each E-number to the vibration control section 504. The NC control section 501 extracts, out of the information included in the machining condition file, information on the focal length of the focusing lens 34 that is required to determine the vibration pattern, and supplies the information to the vibration control section 504. It is preferable that in addition to the information on the focal length, the NC control section 501 extracts information on the focus compensation amount and supplies the information to the vibration control section 504. Although not illustrated in FIG. 6, the information on the focus compensation amount is also used to control the drive section of the focusing lens 34 so that the focus position of the laser beam is adjusted. Further, the NC control section 501 supplies vector information to move the laser beam to the vibration control section 504, based on a machining command starting with G01, G02 or the like and given to move the laser beam.

The vibration control section 504 reads the pattern program corresponding to the vibration pattern number from the pattern program retention section 503. The vibration control section 504 controls the drive sections 322 and 324 of the galvano scanner unit 32 to vibrate the laser beam in the selected vibration pattern and on the set conditions, based on the pattern program, the vector information, and the focal length and focus compensation amount of the focusing lens 34.

An offset value indicating a distance by which the laser beam emitted from the opening 36a of the nozzle 36 is offset from the center of the opening 36a in at least one of the x-direction and the y-direction may be set in accordance with the machining program or the machining condition file, or by manual setting through the operation section 40. In this case, the NC control section 501 supplies offset values in the x-direction and the y-direction to the vibration control section 504.

The moving mechanism including the X-axis carriage 22 and the Y-axis carriage 23 (hereinafter, referred to as the moving mechanisms 22 and 23) has drive sections 220 and 230 that drive the moving mechanisms 22 and 23, respectively. The moving mechanism control section 505 controls the drive sections 220 and 230 based on the machining command to move the laser beam, and moves the machining head 35. The moving mechanism control section 505 controls the drive sections 220 and 230 to move the machining head 35, for example, every millisecond. Therefore, the cutting advancing direction in which the sheet metal W is cut with the laser beam is controlled in a control period of 1 ms (a first control period).

Figure 11:
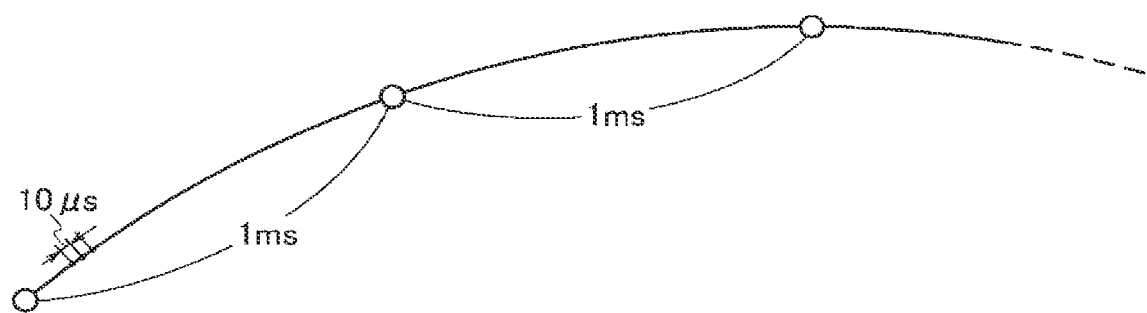
FIG. 11 is a diagram illustrating a relationship between a control period when a moving mechanism moves the machining head and a control period when the beam vibrating mechanism vibrates the laser beam.

The vibration control section 504 may control the drive sections 322 and 324 in a control period shorter than 1 ms, and control the vibration of the laser beam in a control period shorter than 1 ms. FIG. 11 conceptually illustrates a state where the moving mechanism control section 505 circularly moves the machining head 35 (the laser beam) in the control period of 1 ms, based on the machining command starting with G02 (or G03). The vibration control section 504 controls the vibration of the laser beam, for example, in a control period of 1 ms divided by 100, i.e., 10 μs (a second control period). Thus, the laser beam can be highly precisely vibrated in a pattern set with each vibration pattern every 10 μs.

Note that periods in the first control period and the second control period can be arbitrarily set in circumstances of the NC device 50, and motor amplifiers or motors of the moving mechanisms 22 and 23. Further, another control period can be set to a middle between the first control period and the second control period to further subdivide the first control period.

The present invention is not limited to the one or more embodiments described above, and can be variously changed within the range without departing from the summary of the present invention. In the one or more embodiments, the parameter to determine the way of vibration in the vibration pattern is divided into the first parameter and the second parameter, but the way of setting the parameter is arbitrary as long as the specific way of vibration in each vibration pattern can be determined. The functional configuration in the NC device 50 illustrated in FIG. 6 may be acquired by executing a computer program stored in a non-temporary storage medium by a central processing unit of the NC device 50.

The disclosure of this application relates to the subject described in Japanese Patent Application No. 2018-198278 filed on Oct. 22, 2018, the entire disclosed contents of which are incorporated herein by reference.

The invention claimed is:

1. A laser machining apparatus, comprising:
 a moving mechanism configured to relatively move a machining head emitting a laser beam, with respect to a sheet metal along a surface of the sheet metal;
 a beam vibrating mechanism configured to vibrate the laser beam for irradiation on the sheet metal, while the machining head is relatively moved by the moving mechanism; and
 a machining condition setting section configured to set pattern selection information to select a vibration pattern of the laser beam by the beam vibrating mechanism, and parameters to determine a way of vibration in the vibration pattern, specified for each machining command to machine the sheet metal in a machining program generated to machine the sheet metal, and in accordance with machining conditions including a machining velocity of the sheet metal associated with relative movement of the machining head by the moving mechanism, wherein:
 the parameters includes a first parameter and a second parameter, the first parameter is a parameter to determine a shape of each vibration pattern in which a frequency ratio of a frequency at which the laser beam is vibrated in the x-direction to a frequency at which the laser beam is vibrated in the y-direction and a phase difference between the vibration in the x-direction and the vibration in the y-direction for each vibration pattern are set, the x-direction being a cutting advancing direction of the sheet metal and the y-direction being a direction orthogonal to the x-direction within a surface of the sheet metal, and the second parameter is a parameter to determine an amplitude and frequency of each vibration pattern in which a set value to set an amplitude in the x-direction, a set value to set an amplitude in the y-direction, and frequency for each vibration pattern are set.

2. The laser machining apparatus according to claim 1, further comprising:

a storage section configured to store a machining condition file containing a plurality of machining conditions with the pattern selection information and the first and second parameters being set to the machining conditions by the machining condition setting section;

a pattern program generation section configured to generate a pattern program corresponding to the vibration pattern, based on the pattern selection information and the first and second parameters for each of the machining conditions included in the machining condition file read from the storage section; and a vibration control section configured to control the beam vibrating mechanism to vibrate the laser beam based on the pattern program, when the sheet metal is machined for each of the machining commands.

3. A method for setting machining conditions, comprising:

reading a machining condition file from a storage section, machining conditions when machining a sheet metal being set in the machining condition file in correspondence to each machining condition number of a plurality of machining condition numbers;

displaying, on a display, at least the plurality of machining condition numbers in the read machining condition file; and setting pattern selection information to select a vibration pattern of a laser beam for irradiation on the sheet metal, and parameters to determine a way of vibration in the vibration pattern, in correspondence to each machining condition number of the plurality of machining condition numbers displayed on the display, wherein:

the parameters includes a first parameter and a second parameter, the first parameter is a parameter to determine a shape of each vibration pattern in which a frequency ratio of a frequency at which the laser beam is vibrated in the x-direction to a frequency at which the laser beam is vibrated in the y-direction and a phase difference between the vibration in the x-direction and the vibration in the y-direction for each vibration pattern are set, the x-direction being a cutting advancing direction of the sheet metal and the y-direction being a direction orthogonal to the x-direction within a surface of the sheet metal, and the second parameter is a parameter to determine an amplitude and frequency of each vibration pattern in which a set value to set an amplitude in the x-direction, a set value to set an amplitude in the y-direction, and frequency for each vibration pattern are set.

4. A control device for a laser machining apparatus, the control device being configured to control the laser machining apparatus comprising a moving mechanism configured to relatively move a machining head emitting a laser beam, with respect to a sheet metal along a surface of the sheet metal, and a beam vibrating mechanism configured to vibrate the laser beam for irradiation on the sheet metal, while the machining head is relatively moved by the moving mechanism, the control device being configured to:

read, from a machining program database, a machining program generated to machine the sheet metal and including a command to select a machining condition file, and read, out of a plurality of machining condition files stored in a machining condition database, a machining condition file selected based on the command to select the machining condition file, the command being included in the read machining program, the machining condition file including:

a machining condition number specified for each machining command to machine the sheet metal in the machining program, velocity data set in correspondence to each machining condition number, and indicating a machining velocity of the sheet metal associated with relative movement of the machining head by the moving mechanism, pattern selection information set in correspondence to each machining condition number, to select a vibration pattern of the laser beam by the beam vibrating mechanism, and parameters set in correspondence to each machining condition number, to determine a way of vibration in the vibration pattern, wherein:

the parameters includes a first parameter and a second parameter, the first parameter is a parameter to determine a shape of each vibration pattern in which a frequency ratio of a frequency at which the laser beam is vibrated in the x-direction to a frequency at which the laser beam is vibrated in the y-direction and a phase difference between the vibration in the x-direction and the vibration in the y-direction for each vibration pattern are set, the x-direction being a cutting advancing direction of the sheet metal and the y-direction being a direction orthogonal to the x-direction within a surface of the sheet metal, and the second parameter is a parameter to determine an amplitude and frequency of each vibration pattern in which a set value to set an amplitude in the x-direction, a set value to set an amplitude in the y-direction, and frequency for each vibration pattern are set, the control device being configured to:

control the moving mechanism to relatively move the machining head at the machining velocity based on the velocity data, for each machining condition number, and control the beam vibrating mechanism to vibrate the laser beam by the way of vibration based on the first and second parameters, in the vibration pattern based on the pattern selection information, for each machining condition number.

* * * * *